United States Patent
Ur et al.

(10) Patent No.: US 7,765,475 B2
(45) Date of Patent: Jul. 27, 2010

(54) LIST DISPLAY WITH REDUNDANT TEXT REMOVAL

(75) Inventors: Shmuel Ur, Shorashim (IL); Elad Yom-Tov, Hoshaya (IL)

(73) Assignee: International Business Machines Corporation, Armonk, NY (US)

( * ) Notice: Subject to any disclaimer, the term of this patent is extended or adjusted under 35 U.S.C. 154(b) by 838 days.

(21) Appl. No.: 11/423,713

(22) Filed: Jun. 13, 2006

(65) Prior Publication Data

US 2007/0288866 A1  Dec. 13, 2007

(51) Int. Cl.
*G06F 17/00* (2006.01)
(52) U.S. Cl. .................. 715/256; 715/207; 715/225; 715/255
(58) Field of Classification Search ............ 715/225, 715/245, 815–816, 828, 207, 255, 256, 261, 715/271, 738; 345/168
See application file for complete search history.

(56) References Cited

U.S. PATENT DOCUMENTS

| | | | | |
|---|---|---|---|---|
| 6,952,799 | B2* | 10/2005 | Edwards et al. | 715/207 |
| 6,978,419 | B1* | 12/2005 | Kantrowitz | 715/209 |
| 7,225,407 | B2* | 5/2007 | Sommerer et al. | 715/738 |
| 2005/0125147 | A1 | 6/2005 | Mueller | |
| 2006/0036568 | A1 | 2/2006 | Moore et al. | |
| 2007/0006074 | A1* | 1/2007 | Roto et al. | 715/525 |

* cited by examiner

*Primary Examiner*—William L Bashore
*Assistant Examiner*—Andrew Tank

(57) ABSTRACT

A computer-implemented method for a list display with redundant text removal, the method including firstly displaying within a display area on a computer display at least a portion of a first item of a group of consecutive list items that share either of a common prefix and a common suffix, and a secondly displaying in a next list item display location of the display area an abbreviation indicator contiguous with a portion of a next item in the group, where the portion is at least partially unique to the next item with respect to positionally-corresponding portions of the other items in the group.

16 Claims, 3 Drawing Sheets

LIST DISPLAY WITH REDUNDANT TEXT REMOVAL

FIELD OF THE INVENTION

The present invention relates to computer-based user interfaces in general, and more particularly to displaying lists within computer-based user interfaces.

BACKGROUND OF THE INVENTION

Computer-based user interfaces typically display lists of items, such as file names, directory names, or other object names, within a display area, such as within a navigation window or a listbox. Where the length of a list item is greater than the width of the display area in which the item is displayed, the list item will not be entirely visible. This is demonstrated by way of example in FIG. 1A, where the list item "com.ibm.hrl.juru" is only partially visible when it is displayed within a listbox 100 on the display of a computer 102. Typically, in order to view the entire list item, either the display area may be widened, or, if a horizontal scrollbar is provided, the scrollbar may be slid to reveal the hidden portion of the list item. It may be possible to uniquely identify a partially-displayed list item by its visible portion if the visible portion is unique among the visible portions of other displayed items in the list, as is the case for the list item "com.ibm.hrl.juru" among the other items in listbox 100. However, where multiple list items have a common prefix, such as the prefix "com.ibm.hrl.juru" shared by each of the list items in list 104 as shown by way of example in FIG. 1B, unless the display area is wide enough to allow for the display of a unique portion of each list item, it will not be possible to distinguish between the different list items without manipulating the display area as described above.

SUMMARY OF THE INVENTION

The present invention discloses a system and method for displaying a list in a computer-based user interface in a manner that improves readability by removing redundant text.

In one aspect of the invention a computer-implemented method is provided for list display with redundant text removal, the method including firstly displaying within a display area on a computer display at least a portion of a first item of a group of consecutive list items that share either of a common prefix and a common suffix, and secondly displaying in a next list item display location of the display area an abbreviation indicator contiguous with a portion of a next item in the group, where the portion is at least partially unique to the next item with respect to positionally-corresponding portions of the other items in the group.

In another aspect of the present invention the firstly displaying step includes displaying the first item starting with the first character of the first item and continuing either until the first item is fully displayed or until no more of the first item can fit within the width of the display area.

In another aspect of the present invention the firstly displaying step includes displaying the abbreviation indicator followed by one or more characters of the first item past the prefix.

In another aspect of the present invention the secondly displaying step includes secondly displaying if the width of the display area is insufficient to accommodate the display of the next item in its entirety.

In another aspect of the present invention the secondly displaying step includes secondly displaying where the abbreviation indicator is followed by one or more characters of the next item past the prefix.

In another aspect of the present invention the secondly displaying step includes secondly displaying where the abbreviation indicator is preceded by one or more characters of the next item before the suffix.

In another aspect of the present invention the secondly displaying step includes secondly displaying where the portion of the next item that is contiguous to the abbreviation indicator starts at the beginning of a word.

In another aspect of the present invention the secondly displaying step includes secondly displaying before the abbreviation indicator one or more characters of the next item starting with the first character of the next item.

In another aspect of the present invention the method further includes thirdly displaying a plurality of abbreviation indicators contiguous to at least one character of a list item of a subgroup of consecutive list items within the group, where the list items in the subgroup share either of a common extended prefix that includes the common prefix of the group and a common extended suffix that includes the common suffix of the group, and where the at least one character contiguous to the plurality of abbreviation indicators is taken from a location within the subgroup item other than within the common text.

In another aspect of the present invention the method further includes displaying between any of the abbreviation indicators a portion of the common extended text that is not within the first common prefix.

In another aspect of the present invention a list display system is provided with redundant text removal, the system including a computer configured to provide a display area, a list display formatter configured to display within the display area at least a portion of a first item of a group of consecutive list items that share either of a common prefix and a common suffix, and display in a next list item display location of the display area an abbreviation indicator contiguous with a portion of a next item in the group, where the portion is at least partially unique to the next item with respect to positionally-corresponding portions of the other items in the group.

In another aspect of the present invention the formatter is configured to display the first item starting with the first character of the first item and continuing either until the first item is fully displayed or until no more of the first item can fit within the width of the display area.

In another aspect of the present invention the formatter is configured to display the abbreviation indicator followed by one or more characters of the first item past the prefix.

In another aspect of the present invention the formatter is configured to display the next item if the width of the display area is insufficient to accommodate the display of the next item in its entirety.

In another aspect of the present invention the formatter is configured to display the next item where the abbreviation indicator is followed by one or more characters of the next item past the prefix.

In another aspect of the present invention the formatter is configured to display the next item where the abbreviation indicator is preceded by one or more characters of the next item before the suffix.

In another aspect of the present invention the formatter is configured to display the next item where the portion of the next item that is contiguous to the abbreviation indicator starts at the beginning of a word.

In another aspect of the present invention the formatter is configured to display before the abbreviation indicator one or more characters of the next item starting with the first character of the next item.

In another aspect of the present invention the formatter is configured to display a plurality of abbreviation indicators contiguous to at least one character of a list item of a subgroup of consecutive list items within the group, where the list items in the subgroup share either of a common extended prefix that includes the common prefix of the group and a common extended suffix that includes the common suffix of the group, and where the at least one character contiguous to the plurality of abbreviation indicators is taken from a location within the subgroup item other than within the common text.

In another aspect of the present invention the formatter is configured to display between any of the abbreviation indicators a portion of the common extended text that is not within the first common prefix.

In another aspect of the present invention a computer-implemented program is provided embodied on a computer-readable medium, the computer-implemented program including a first code segment operative to firstly display within a display area on a computer display at least a portion of a first item of a group of consecutive list items that share either of a common prefix and a common suffix, and a second code segment operative to secondly displaying in a next list item display location of the display area an abbreviation indicator contiguous with a portion of a next item in the group, where the portion is at least partially unique to the next item with respect to positionally-corresponding portions of the other items in the group.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

Figure 1B:
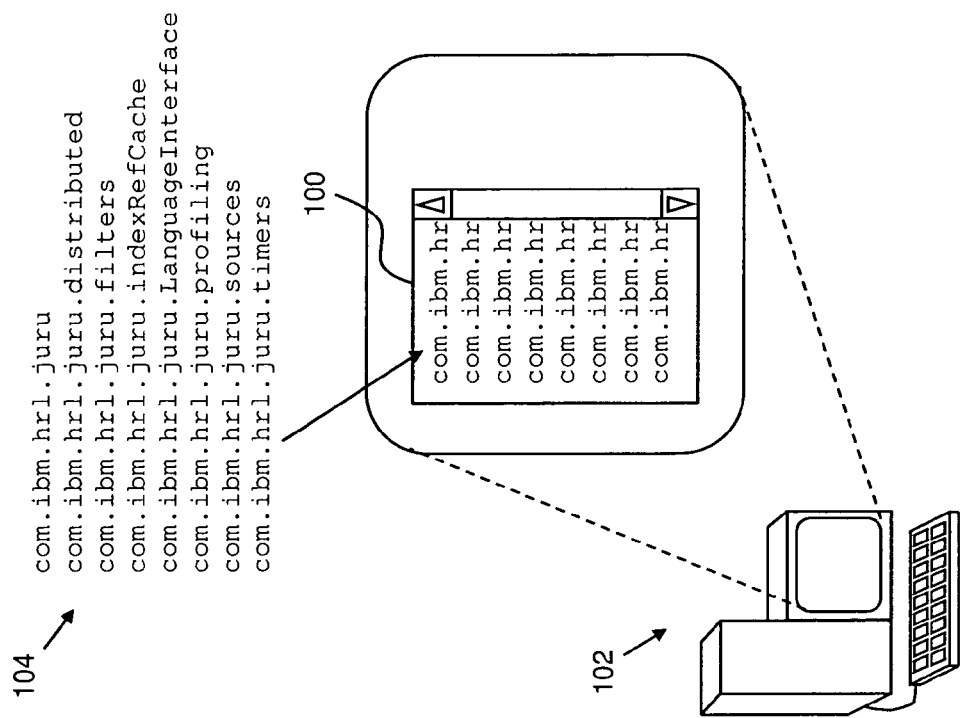
FIGS. 1A and 1B are examples of lists displayed with partially hidden list items which are useful in understanding the present invention.
Figure 1A:
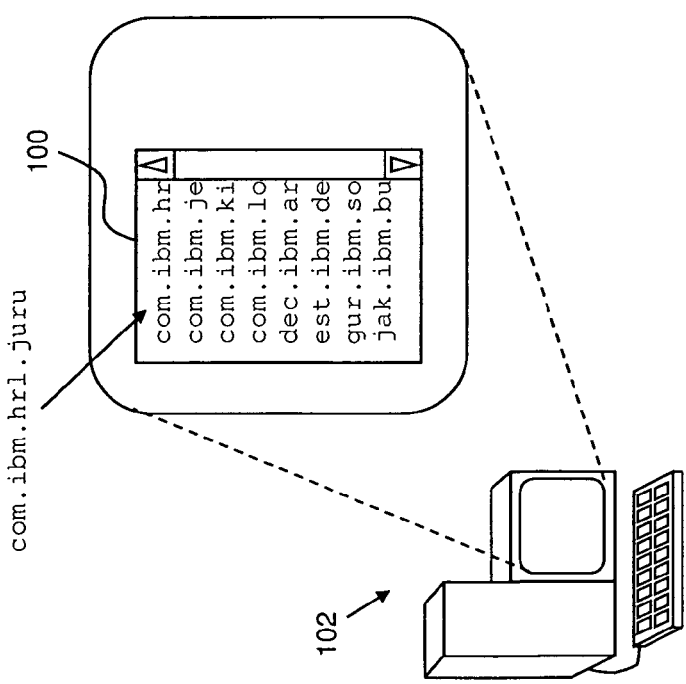
Figure 2:
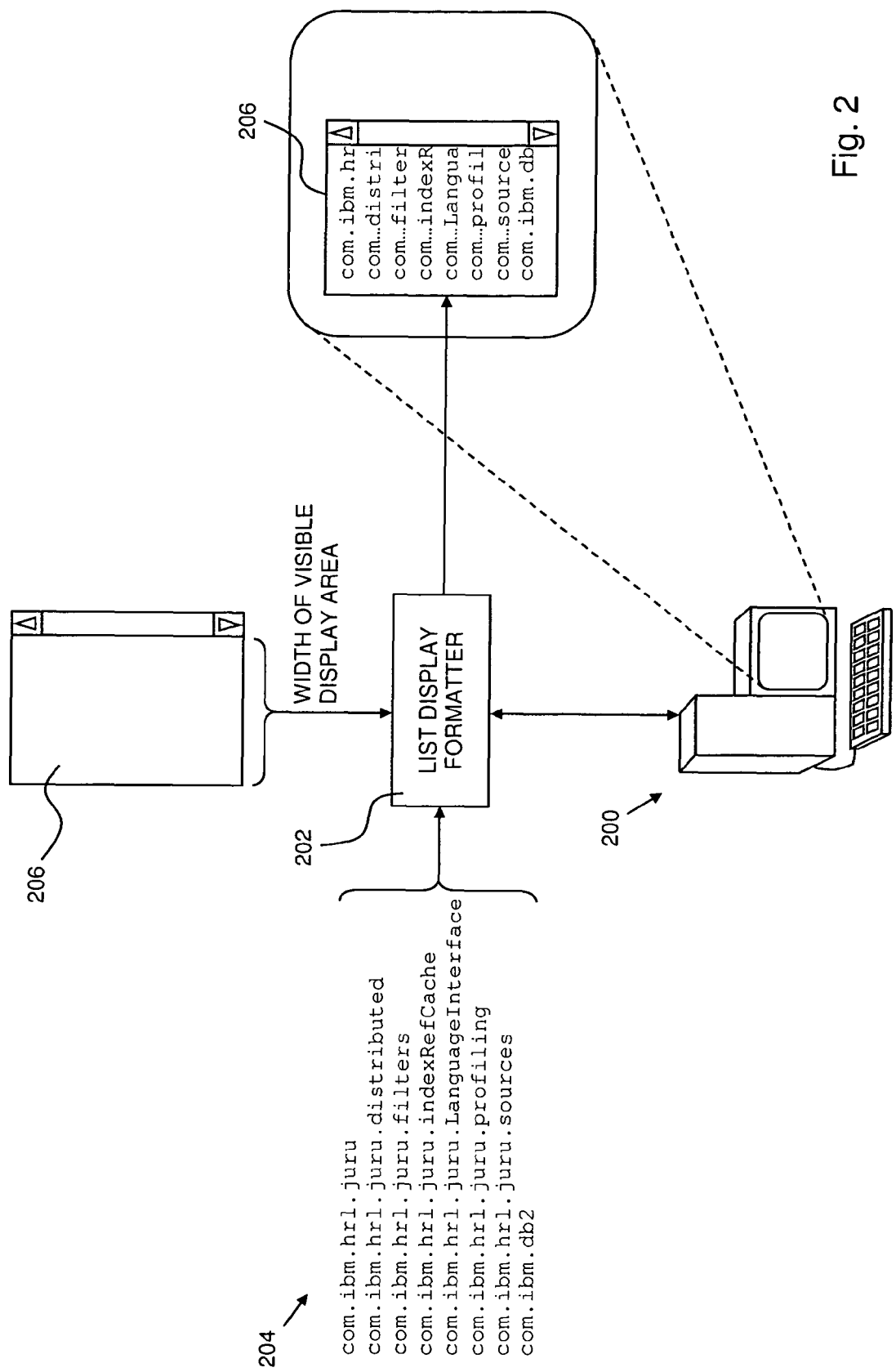
FIG. 2 is a simplified conceptual illustration of a list display system with redundant text removal, operative in accordance with an embodiment of the present invention.
Figure 3:
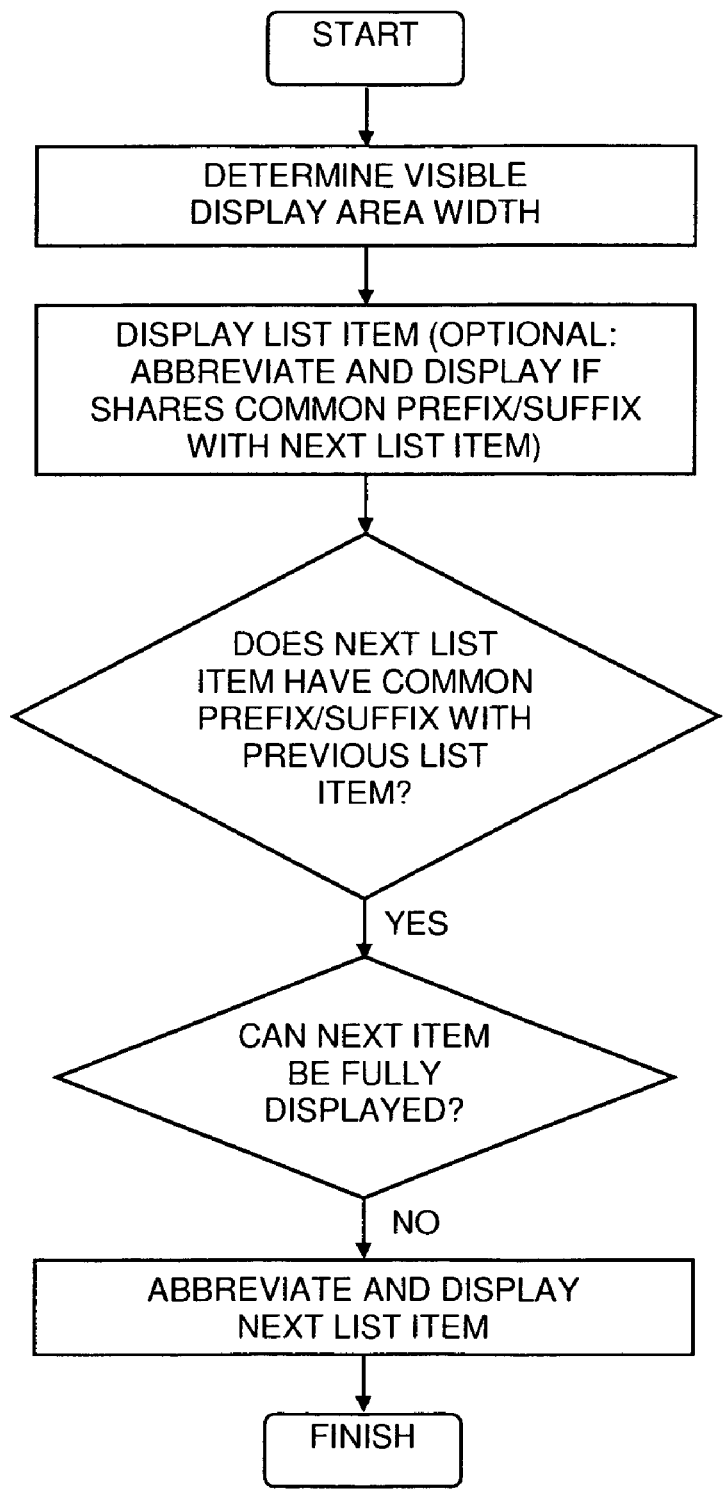
FIG. 3 is a simplified flowchart illustration of an exemplary method of operation of the system of FIG. 2, operative in accordance with an embodiment of the present invention.

Reference is now made to FIG. 2, which is a simplified conceptual illustration of a list display system with redundant text removal, operative in accordance with an embodiment of the present invention, and additionally to FIG. 3, which is a simplified flowchart illustration of an exemplary method of operation of the system of FIG. 2, operative in accordance with an embodiment of the present invention. In the system and method of FIGS. 2 and 3, a computer 200 is shown on which a list display formatter 202 may be executed for formatting a list 204 for display within a display area, such as of a listbox 206 on computer 200's display. Formatter 202 determines the width of the visible display area in which list 204 is to be displayed, and then determines which portions of each item in list 204 to display within the display area as follows.

In one embodiment, the first list item to be displayed within the display area is preferably displayed starting with the first character of the list item and continuing either until list item is fully displayed, if it is not wider than the display area, or until no more of the list item can fit within the width of the display area. The next list item to be displayed, such as on the next line in listbox 206, is compared with its predecessor to determine whether the list items share a common prefix, preferably of a minimum predetermined length. For example, the first two items in list 204 share the common prefix "com.ibm.hrl.juru." If the items share a common prefix, and the width of the display area is insufficient to accommodate the display of the next list item in its entirety, the next list item is preferably displayed in the next list item display location, such as below the first list item, in an abbreviated fashion, such as where one or more characters of the next list item is displayed starting with the first character of the list item, followed by an abbreviation indicator, such as " . . . " or one or more blank spaces, which is followed by one or more characters after the common prefix, preferably including at least the first character after the common prefix. Preferably, the visible portion of the next list item should extend the width of the display area. Although the number of characters displayed before and after the abbreviation indicator may be determined in a variety of ways, the portion of the list item that follows the abbreviation indicator should, if possible and where applicable, start at the beginning of a word, provided that doing so will allow for the display of at least the first character after the common prefix. The number of characters displayed before the abbreviation indicator may be reduced or eliminated entirely in order that the portion of the list item that follows the abbreviation indicator starts at the beginning of a word and includes the display of at least the first character after the common prefix.

In another embodiment, the common prefix of consecutive items is identified and is not displayed at all, but is replaced by an abbreviation indicator for both the first list item and any subsequent consecutive list items. The items are then displayed as described above.

Groups of consecutive list items that share a common prefix may be found at different places within a list, and such groups may also be found within other groups to form subgroups, such as where list items in one group share a common prefix X, while the group includes another group whose list items share a common extended prefix X+Y. Thus, for each group of consecutive list items within a list, where each list item in the group shares a common prefix, if the first list item in the group does not itself share a common prefix with its predecessor (e.g., it is the first item in the list overall) it is preferably displayed without modification, with as much of the first item being displayed within the visible display area as possible, with subsequent list items within the group being displayed in an abbreviated fashion as described herein. An abbreviation indicator is preferably maintained for each unique prefix. Thus, for three consecutive list items A, B, and C, if A and B share the same prefix X, and B and C share the same extended prefix X+Y, C may be displayed with two abbreviation indicators, one corresponding to X and one corresponding to Y, optionally separated by one or more characters at the beginning of Y. Thus, for example, where:

A=com.ibm.hrl.juru.LanguageInterface
B=com.ibm.hrl.juru.migrate.juru_4_0_11.com.ibm.hrl.juru
C=com.ibm.hrl.juru.migrate.juru_4_0_11.com.ibm.hrl.juru.poeIndex then:
X="com.ibm.hrl.juru."
Y="migrate.juru_4_0_11.com.ibm.hrl.juru"

resulting in the following possible display:

```
|com.ibm.hrl.juru.Languag |
|com...migrate.juru_4_0_1 |
|com...migra...poeIndex   |
``` where | bounds the visible display area.

Alternatively, the portion of the list item that precedes each abbreviation indicator may be eliminated altogether, as follows:

```
|com.ibm.hrl.juru.Langu |
|...migrate.juru_4_0_11 |
|......poeIndex         |
```

Each subsequent list item is preferably processed in the same manner. Where possible, should a number of consecutive items in a list all include a common prefix, they may all be displayed with the same characters (or none) preceding the abbreviation indicator.

Alternatively, should a number of consecutive items in a list all include a common prefix, the prefix may be displayed as the topmost branch in a tree. Each item in the list that share the common prefix may then be displayed as a node in the tree starting with the display of at least the first character after the common prefix as follows:

```
|com.ibm.hrl.juru     |
|...\                 |
|...distributed       |
|...filters           |
|...indexRefCache     |
|...LanguageInterfac  |
|...profiling         |
|...sources           |
|...timers            |
```

It will be appreciated that the present invention is applicable to consecutive list items that share a common suffix. Thus, for example, where two consecutive list items A and B share the same suffix X, such as where:

A=com.ibm.hrl.juru.LanguageInterface
B=net.ibm.hrl.juru.LanguageInterface then:

X=".ibm.hrl.juru.LanguageInterface"

resulting in the following possible display:

```
        |com...Languag |
        |net...Languag |
  or:
        |com...        |
        |net...        |
```

The present invention is also applicable where consecutive list items share both a common prefix and a common suffix. Thus, for example, where two consecutive list items A and B share the same prefix X and the same suffix Y, such as where:

A=com.ibm.hrl.juru.Washington.LanguageInterface
B=com.ibm.hrl.juru.Baltimore.LanguageInterface then:

X="com.ibm.hrl.juru."

Y=".LanguageInterface"

resulting in the following possible display:

```
        |...Washingto...    |
        |...Baltimore...    |
  or:
        |com...Washingto...Lan |
        |com...Baltimore...Lan |
```

Thus, whether consecutive list items share a common prefix, a common suffix, or both, an abbreviation indicator may be displayed for a list item in place of some or all of the common prefix and/or suffix, together with a portion of the list item contiguous to the abbreviation indicator, where the portion is at least partially unique to the list item with respect to positionally-corresponding portions of the other list items.

Other methods for removing redundant characters among list items may be considered, such as by measuring the amount of information added by each character using measures such as mutual information, and removing those characters that add information below a certain threshold.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer-implemented method for list display with redundant text removal, the method comprising:
firstly displaying within a list display area on a computer display at least a portion of a first text item;
secondly displaying in said list display area of said display at least a portion of a second text item; and
thirdly displaying in said list display area of said display at least a portion of a third text item,
wherein a first portion of each of said second and third text items that is common to said first, second, and third text items is replaced with a first abbreviation indicator, and
wherein a second portion of said third text item that is common to said second and third text items and that is exclusive of said first portion is replaced with a second abbreviation indicator.

2. A method according to claim 1 wherein said firstly displaying step comprises displaying said first item starting with the first character of said first item and continuing either until said first item is fully displayed or until no more of said first item can fit within the width of said display area.

3. A method according to claim 1 wherein said secondly displaying step comprises displaying said first abbreviation indicator followed by one or more characters of said second item past said first portion.

4. A method according to claim 1 wherein said secondly displaying step comprises secondly displaying if the width of said display area is insufficient to accommodate the display of said second item in its entirety.

5. A method according to claim 1 wherein said thirdly displaying step comprises thirdly displaying wherein said second abbreviation indicator is followed by one or more characters of said third item past said second portion.

6. A method according to claim 1 wherein said thirdly displaying step comprises thirdly displaying wherein said second abbreviation indicator is preceded by one or more characters of said third item preceding said second portion.

7. A method according to claim 1 wherein said secondly displaying step comprises secondly displaying wherein said first abbreviation indicator is immediately followed by the beginning of a word.

8. A method according to claim 1 wherein said secondly displaying step comprises secondly displaying before said first abbreviation indicator one or more characters of said second item starting with the first character of said second item.

9. A list display system with redundant text removal, the system comprising:
- a computer configured to provide a list display area on a computer display; and
- a list display formatter configured to
  - display within said list display area at least a portion of a first text item,
  - display in said list display area at least a portion of a second text item; and
  - display in said list display area at least a portion of a third text item,
- wherein said list display formatter is configured to replace a first portion of each of said second and third text items that is common to said first, second, and third text items with a first abbreviation indicator, and
- wherein said list display formatter is configured to replace a second portion of said third text item that is common to said second and third text items and that is exclusive of said first portion with a second abbreviation indicator.

10. A system according to claim 9 wherein said formatter is configured to display said first item starting with the first character of said first item and continuing either until said first item is fully displayed or until no more of said first item can fit within the width of said display area.

11. A system according to claim 9 wherein said formatter is configured to display said first abbreviation indicator followed by one or more characters of said second item past said first portion.

12. A system according to claim 9 wherein said formatter is configured to display said second item if the width of said display area is insufficient to accommodate the display of said second item in its entirety.

13. A system according to claim 9 wherein said formatter is configured to display said third item wherein said second abbreviation indicator is followed by one or more characters of said third item past said second portion.

14. A system according to claim 9 wherein said formatter is configured to display said third item wherein said second abbreviation indicator is preceded by one or more characters of said third item preceding said second portion.

15. A system according to claim 9 wherein said formatter is configured to display said second item wherein said first abbreviation indicator is immediately followed by the beginning of a word.

16. A computer-readable medium embodying a computer-implemented program, the computer-readable medium comprising:
- a first code segment operative to firstly within a list display area on a computer display at least a portion of a first text item;
- a second code segment operative to secondly display in said list display area of said display at least a portion of a second text item; and
- a third code segment operative to thirdly display in said list display area of said display at least a portion of a third text item,
- wherein a first portion of each of said second and third text items that is common to said first, second, and third text items is replaced with a first abbreviation indicator, and
- wherein a second portion of said third text item that is common to said second and third text items and that is exclusive of said first portion is replaced with a second abbreviation indicator.

* * * * *